(12) United States Patent
Kitada

(10) Patent No.: US 8,885,205 B2
(45) Date of Patent: Nov. 11, 2014

(54) ELECTRONIC DEVICE, PRINTER, STATUS MANAGEMENT METHOD FOR AN ELECTRONIC DEVICE, AND RECORDING MEDIUM

(75) Inventor: Naruhide Kitada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 318 days.

(21) Appl. No.: 13/253,021

(22) Filed: Oct. 4, 2011

(65) Prior Publication Data
US 2012/0081754 A1 Apr. 5, 2012

(30) Foreign Application Priority Data
Oct. 5, 2010 (JP) ................... 2010-225659

(51) Int. Cl.
*G06K 15/00* (2006.01)
*G06F 17/30* (2006.01)
*G06F 15/00* (2006.01)

(52) U.S. Cl.
CPC ............... *G06F 17/30289* (2013.01)
USPC .......... 358/1.18; 358/1.1; 358/1.13; 358/1.16

(58) Field of Classification Search
USPC ............ 358/1.1, 1.4, 1.5, 1.6, 1.9, 1.11, 1.12, 358/1.13, 1.14, 1.15, 1.16, 1.17, 1.18
See application file for complete search history.

(56) References Cited

U.S. PATENT DOCUMENTS

| | | | |
|---|---|---|---|
| 2007/0008583 A1* | 1/2007 | Araki | 358/1.15 |
| 2007/0247655 A1* | 10/2007 | Rosenfeld et al. | 358/1.15 |
| 2008/0309967 A1 | 12/2008 | Ferlitsch et al. | |
| 2011/0099272 A1* | 4/2011 | Takahashi | 709/224 |

FOREIGN PATENT DOCUMENTS

| | | |
|---|---|---|
| JP | 08-179896 A | 7/1996 |
| JP | 2001-229052 A | 8/2001 |
| JP | 2006-157386 A | 6/2006 |
| JP | 2008-310813 A | 12/2008 |
| JP | 2010-152838 A | 7/2010 |
| JP | 2010-250548 A | 11/2010 |

* cited by examiner

*Primary Examiner* — Thierry L Pham
(74) *Attorney, Agent, or Firm* — Kilpatrick Townsend & Stockton LLP (57) ABSTRACT

Electronic devices, such as printers, that provide application status management are disclosed, as well as related methods. A printer in which a plurality of applications are installed includes an a database that stores an application identifier for each of the applications; one or more log conversion units that generate a system log from application logs for the applications; a status management unit that monitors the system log for status changes and stores a new status in a status storage unit, and a print output unit that prints the status of all applications recorded in the database from the status storage unit.

9 Claims, 5 Drawing Sheets

<SYSTEM LOG>

Aug 12 18:13:02 APPLICATION X [896:INFO]:Startup OK
Aug 12 18:13:10 APPLICATION X [896:WARNING]: Error data received
Aug 12 18:13:15 APPLICATION Z [897:INFO]:Startup completed
Aug 12 18:13:20 APPLICATION X [896:INFO]:Data unreadable

FIG. 3B

<SYSTEM LOG WITH HARDWARE INFORMATION>

Aug 12 18:13:02 APPLICATION X [896:INFO]:Startup OK
Aug 12 18:30:10 HARDWARE [400:Error]:Printer paper feed error

FIG. 4A

■ INSTALLED APPLICATION STATUS INFORMATION
APPLICATION W: OK
APPLICATION X: ERROR; UNKNOWN DATA
APPLICATION Y: OK
APPLICATION Z: OK

■ HARDWARE STATUS INFORMATION
PAPER FEED: OK
PAPER: LOADED
COVER: CLOSED

FIG. 4B

■ INSTALLED APPLICATION STATUS INFORMATION
APPLICATION W: ERROR
APPLICATION X: ERROR
APPLICATION Y: ERROR
APPLICATION Z: ERROR

■ HARDWARE STATUS INFORMATION
PAPER FEED: ERROR
PAPER: LOADED
COVER: CLOSED

FIG. 5

ELECTRONIC DEVICE, PRINTER, STATUS MANAGEMENT METHOD FOR AN ELECTRONIC DEVICE, AND RECORDING MEDIUM

This application claims priority to Japanese Patent Application No. 2010-225659, filed Oct. 5, 2010, the entirety of which is incorporated by reference herein.

BACKGROUND

1. Technical Field

The present invention relates to application status management for an electronic device, such as a printer, in which a plurality of applications are installed, and related methods.

2. Related Art

Multifunction printers that analyze characteristics of internal hardware and software to detect the device status (operating status), and can output this information formatted for viewing, are known from the literature. See, for example, Japanese Unexamined Patent Appl. Pub. JP-A-2008-310813.

Because multiple applications are often installed in this type of multifunction printer, when a problem occurs it is desirable to identify the application involved. As the number of installed applications increases, monitoring the status of the applications becomes increasingly important. And the number of application platforms, which provide execution environments for the applications, has also increased with increased functionality. These application platforms include, for example, Java® and web browsers.

One way of managing the status of applications running under different application platforms is for each application to have a status output function. This approach, however, means that a status output function must be written into each application, thereby increasing development cost.

SUMMARY

Electronic devices, such as printers, that provide application status management are disclosed, as well as related methods. The disclosed devices and methods enable managing application status information at a low cost.

Thus, in one aspect of the invention, an electronic device in which a plurality of applications is installed is disclosed. The electronic device includes a database that stores an application identifier for each of the applications; one or more log conversion units that generate a system log from application logs for the applications; and a status management unit that, when a status change to a new status occurs in the system log related to an application identifier registered in the database, stores the new status in a status storage unit. The system log includes a plurality of records. At least one of the records corresponds to one of the applications and includes the application identifier and status information for the corresponding application.

In another aspect of the invention, a status management method for an electronic device in which a plurality of applications is installed is disclosed. The method includes acts executed by the electronic device. The method includes storing an application identifier for each application in a database; generating a system log from application logs for the applications; monitoring the system log for changes; and when a status change to a new status occurs in the system log related to an application identifier registered in the database, storing the new status in a status storage unit. The system log includes a plurality of records. At least one of the records corresponds to one of the applications and includes the application identifier and status information for the corresponding application.

By generating a system log from application logs, the status of applications registered in a database can be managed based on the system log. Thus, the status of all applications registered in the database can be managed by simply adding a log conversion function. There is therefore no need to build a separate status output function into each application. Accordingly, the cost of developing a status output function can be eliminated, and application status management can be achieved at low cost.

In many embodiments, the electronic device includes one or more application platforms. Each of the applications is associated with one of the application platforms so that the application platform provides an execution environment for the application. One of the one or more log conversion units can be provided for each application platform.

When two or more applications run under a single application platform, a single log conversion unit can be used to process the logs for the two or more applications thereby reducing the cost of status management compared with a configuration in which each application has a log conversion unit. In addition, because the log conversion unit is installed in conjunction with installing an application platform, status management can be achieved at low cost when multiple application platforms are installed to the electronic device.

The corresponding application platform can be recorded in the database for each application identifier. And the status management unit can determine for at least one of the system log records if the application platform to which the log conversion unit that converted the system log record is installed, and the application platform corresponding to the application identifier contained in the database, are the same. By recording the correlation between applications and application platforms in the database, the status management unit can accurately determine the application to which the converted system log output record from the log conversion unit relates. Accordingly, the status management unit can manage the application status for only the system log record with the application identifier corresponding to the application platform on which the system log record was converted. That is, system log records other than those corresponding to the application platforms on which the system log records were converted may be ignored. This aspect of the invention can thus reliably prevent status evaluation errors.

At least one of the system log records can correspond to a hardware portion of the electronic device and includes status information for the hardware portion. When a hardware status change to a new hardware status occurs in the system log related to a hardware portion of the electronic device, the status management unit can store the new hardware status in the status storage unit. The status management unit can change the application status in the status storage unit in response to changes in the hardware status. For example, when an error is contained in the hardware status, the status management unit can change the application status in the status storage unit to an error.

The electronic device can include a status output unit. The status output unit can output the status of all applications recorded in the database from the status storage unit. This aspect of the invention can output status information using a printing means, display means, or communication means, for example, and enable the user to determine the status of each application registered in the database from a single listing.

In another aspect of the invention, a printer in which a plurality of applications is installed is disclosed. The printer includes a database that stores an application identifier for each of the applications; one or more log conversion units that generate a system log from application logs for the applications; a status management unit that, when a status change to a new status occurs in the system log related to an application identifier registered in the database, stores the new status in a status storage unit. This aspect of the invention enables using the invention for status management in a multifunction printer and outputting the status of applications installed in the printer as a hard copy printout.

Another aspect of the invention is a computer-readable non-transitory storage medium storing a program that causes a computer to execute the acts of the electronic device status management method described above. By causing a computer to execute the program stored on this recording medium, status management of applications installed on the computer can be provided at low cost.

DESCRIPTION OF EMBODIMENTS

Preferred embodiments of an electronic device, a printer, a status management method for the electronic device, and a non-transitory storage medium according to the present invention are described below with reference to the accompanying figures. The invention is described in the context of a multifunction printer with multiple installed applications as an example of an electronic device according to the invention.

Figure 1:
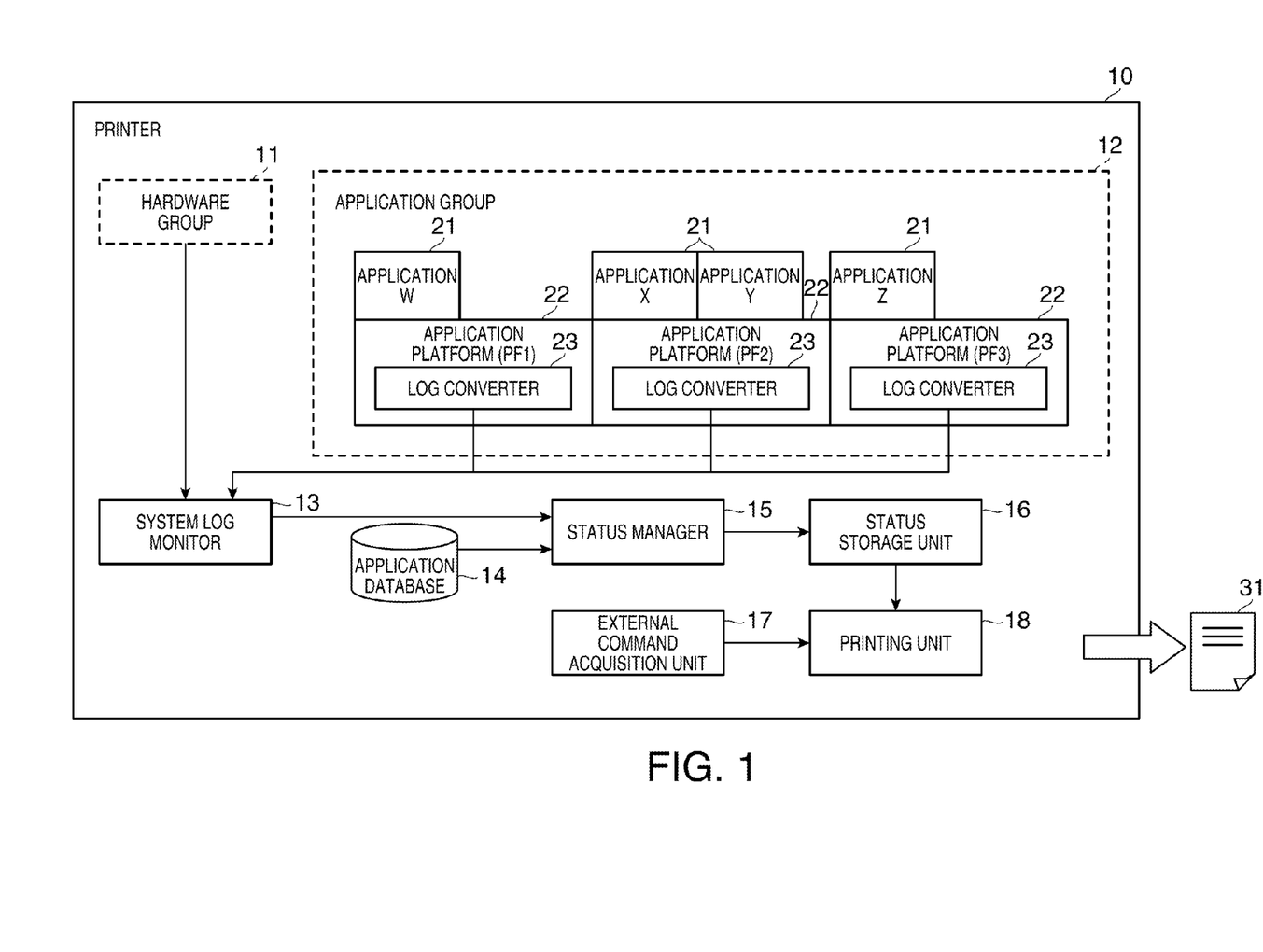
FIG. 1 is a block diagram showing the configuration of a printer according to an embodiment of the invention.

FIG. 1 is a block diagram showing the configuration of a printer 10 according to an embodiment of the invention. As shown in the figure, the printer 10 includes a hardware group 11, an application group 12, a system log monitor 13, an application database 14, a status manager 15, a status storage unit 16, an external command acquisition unit 17, and a printing unit 18 (status output unit).

The hardware group 11 denotes the hardware components in the printer 10, and includes, for example, a paper feed mechanism, paper supply mechanism, and printhead. For example, a cover opening mechanism of a receipt printer that uses drop-in loading roll paper, and a display mechanism of a printer with a display, can be included in the hardware group 11.

The application group 12 includes various applications 21 (applications W to Z in the figure) and application platforms 22 (PF1 to PF3 in the figure). The applications 21 do not have a status output function. Applications with a status output function can be installed to the printer 10 in addition to applications without a status output function, but only applications without a status output function (applications 21) are considered here. Each application 21 records its own application log in the application platform 22.

An application platform 22 is an execution environment for particular applications 21 (that is, a software environment required to execute the application 21), and examples of application platforms 22 include Qt®, Java®, and web browsers. Each application platform 22 has its own log converter 23. The log converter 23 converts the log of an application 21 running under the application platform 22 (the log recorded by the application 21) to a system log. More specifically, each application platform 22 is installed to the printer 10 with a built-in conversion program that functions as the log converter 23.

The four applications 21 with the application identifiers application W, application X, application Y, and application Z, and the three application platforms 22 with the platform identifiers PF1, PF2, PF3, are installed in this embodiment of the invention. As shown in the figure, application W operates under application platform PF1, application X and application Y operate under application platform PF2, and application Z operates under application platform PF3.

The system log monitor 13 monitors the system log converted by the log converters 23. The system log monitor 13 also monitors a system log for the hardware components included in the hardware group 11.

The application database 14 stores an application identifier and the corresponding application platform 22 for each application 21 included in the application group 12. Status information for all applications 21 stored in the application database 14 is printed by the printing unit 18 described below as a status sheet 31.

Based on results from the system log monitor 13 and by referencing the application database 14, the status manager 15 manages the status of the hardware contained in the hardware group 11 and the applications 21 contained in the application group 12. For example, when a log and related application identifier stored in the application database 14 are contained in the system log acquired from the system log monitor 13, the status manager 15 manages the status of the application 21 based on the log with the application identifier.

The status manager 15 also runs a status changing process that changes the status of an application 21 according to the status of the hardware. For example, when the hardware status includes an error, the status of the application 21 contained in the application group 12 is also set to "error." This is described specifically below.

The status storage unit 16 stores the status information managed by the status manager 15. More specifically, the status manager 15 records hardware status information and status information for each application 21 at specific times and/or regularly. Examples of such specific times include when the user performs a specific operation (including asserting an output status command by means of the external command acquisition unit 17 as described below), and immediately after printing ends.

The external command acquisition unit 17 is for acquiring status output commands from external devices, and can be rendered as an input unit of a configuration tool (a signal receiving unit of an external computer), switches, or a touch screen, for example. In this embodiment of the invention, operating information configuring the printer 10 to issue a status sheet 31 is acquired as an external command asserted by a service technician that services the printer 10.

The printing unit 18 prints and outputs the status data as a status sheet 31 for hardware components and each application 21 stored in the status storage unit 16 according to the command acquired by the external command acquisition unit 17. Note that the status sheet 31 could be output on a display screen, output via e-mail or other communication means, or output using various other methods instead of being printed out.

The application database 14, application log, system log, and status sheet 31 are described below with reference to specific examples and FIG. 2 to FIG. 4.

Figure 2A:
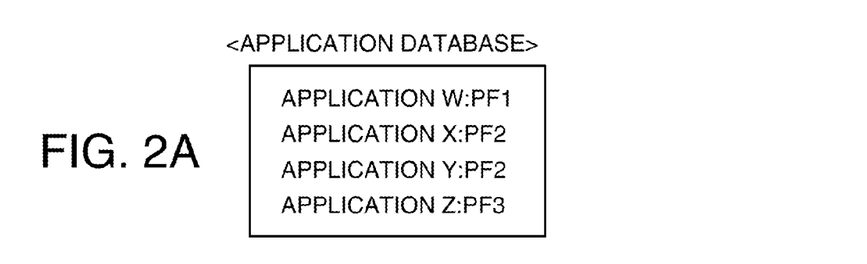
FIG. 2A shows an example of an application database.

FIG. 2A shows an example of the application database 14. The application database 14 is a database that is used to determine whether or not the information contained in the system log relates to an application for which status information is to be output in the status sheet 31. As shown in the figure, the application database 14 stores an application identifier for each application 21 contained in the application group 12 linked to the platform identifier of the application platform 22 on which each application 21 runs.

When an application (such as an application that has a status output function) other than the applications 21 stored in the application database 14 is installed in the printer 10, that application is not managed by the status manager 15 and status information therefore is not contained in the status information output in the status sheet 31. Only status information for those applications 21 registered in the application database 14 is output in the status sheet 31.

The application database 14 is used by the status manager 15 to determine if the application platform 22 of the log converter 23 used for system log conversion, and the application platform 22 of the application identifier contained in the system log, match.

For example, when the same application identifier is store on two different application platforms 22, the status of the application 21 cannot be determined using only the application identifier, but the status of each application 21 can be accurately determined by determining if the application platforms 22 match. In this case, however, the corresponding platform identifier is preferably also printed in addition to the application identifier in the status sheet 31 (FIG. 4). The application name and platform name could obviously also be printed instead of the identifiers.

Figure 2B:
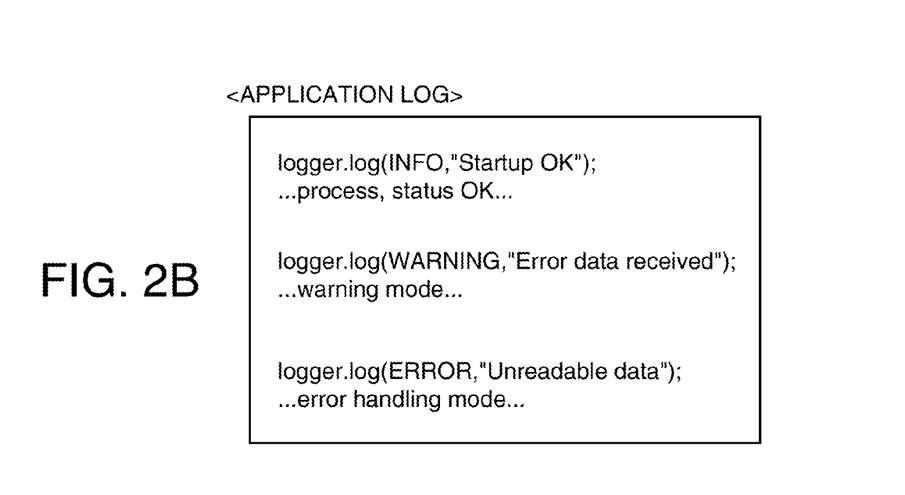
FIG. 2B shows an example of an application log, in accordance with an embodiment.

FIG. 2B shows an example of an application log. An application log is a log that each application 21 records for itself on the application platform 22. As shown in the figure, the application log includes log information such as INFO, WARNING, and ERROR, and additional information such as "Startup OK."

Figure 3A:
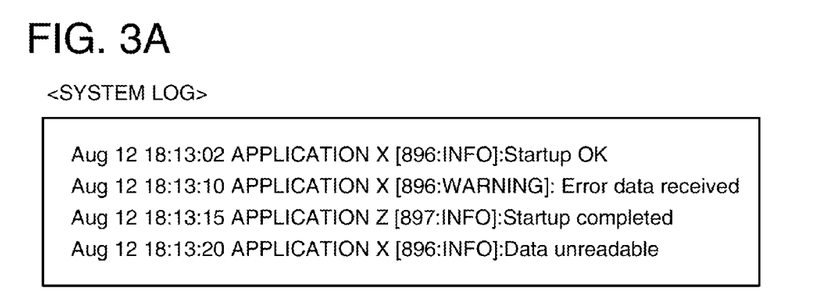
FIG. 3A shows an example of a system log.

FIG. 3A shows an example of a system log. FIG. 3A shows an example in which a system log is recorded for only applications 21. More specifically, the system log collected by the system log monitor 13 shows the results kept by the status manager 15 for each application 21. As shown in the figure, the system log includes such information as the log recording date, application identifier (such as application X), application number (896, 897, for example), log information (such as INFO or ERROR), and additional information (such as "normal startup"). The system log is recorded chronologically even for applications 21 that operate under different application platforms 22, such as application X and application Z.

Figure 3B:
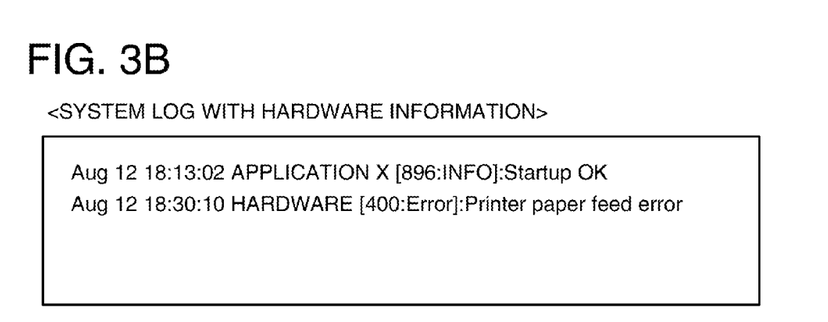
FIG. 3B shows an example of a system log with hardware information, in accordance with an embodiment.

FIG. 3B shows an example of a system log containing hardware information. As shown in the figure, the hardware system log includes the date and time the log was written, hardware number (such as 400), log information, and additional information.

The hardware system log and the system log related to applications 21 are written chronologically without differentiating therebetween.

Figure 4A:
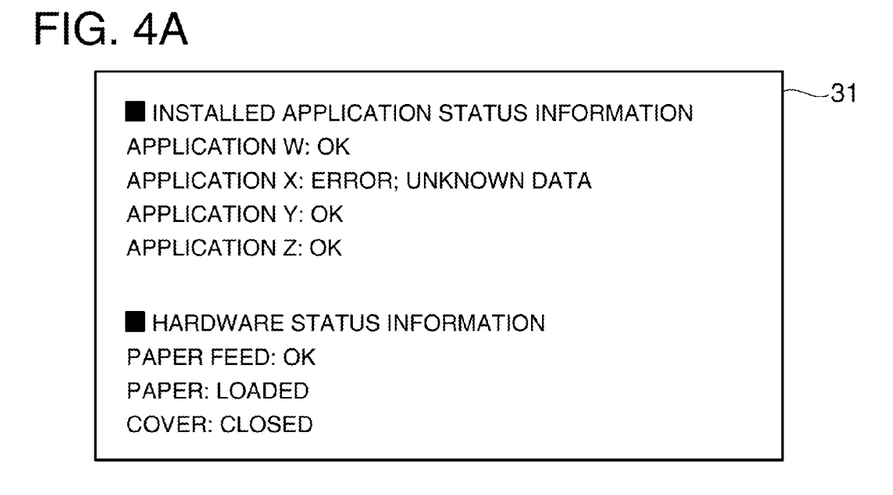
FIG. 4A shows an example of a status sheet corresponding to FIG. 3A.

FIG. 4A shows an example of a status sheet 31 for the system log shown in FIG. 3A. Status information printed in the status sheet 31 is grouped in two fields, installed application status information and hardware status information. The status (OK or ERROR) is printed for every application 21 registered in the application database 14 under the installed application status information. When the status is ERROR, additional information is also printed. Note that because there was no change of status for applications 21 not included in the system log in FIG. 3A (application W and application Y), the status information previously stored in the status storage unit 16 (OK for each in the example in FIG. 4A) is printed.

The status of specific hardware components is printed under hardware status information. For example, the hardware paper feed mechanism status is either OK or ERROR, paper as a hardware component is LOADED or EMPTY, and the hardware cover status is either OPEN or CLOSED.

Figure 4B:
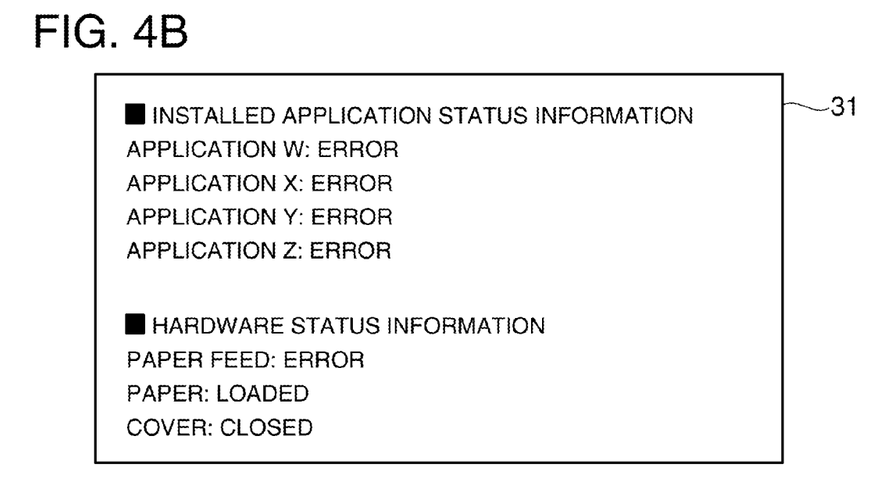
FIG. 4B shows an example of a status sheet corresponding to FIG. 3B, in accordance with an embodiment.

FIG. 4B shows an example of a status sheet 31 corresponding to the system log shown in FIG. 3B. In the example shown in FIG. 4B, an ERROR is printed for the hardware paper feed mechanism. When such a hardware error occurs, the status manager 15 changes the status of all applications 21 registered in the application database 14 to ERROR, thereby indicating that none of the applications 21 can be used. Appropriate status information can thus be reported to the user.

Figure 5:
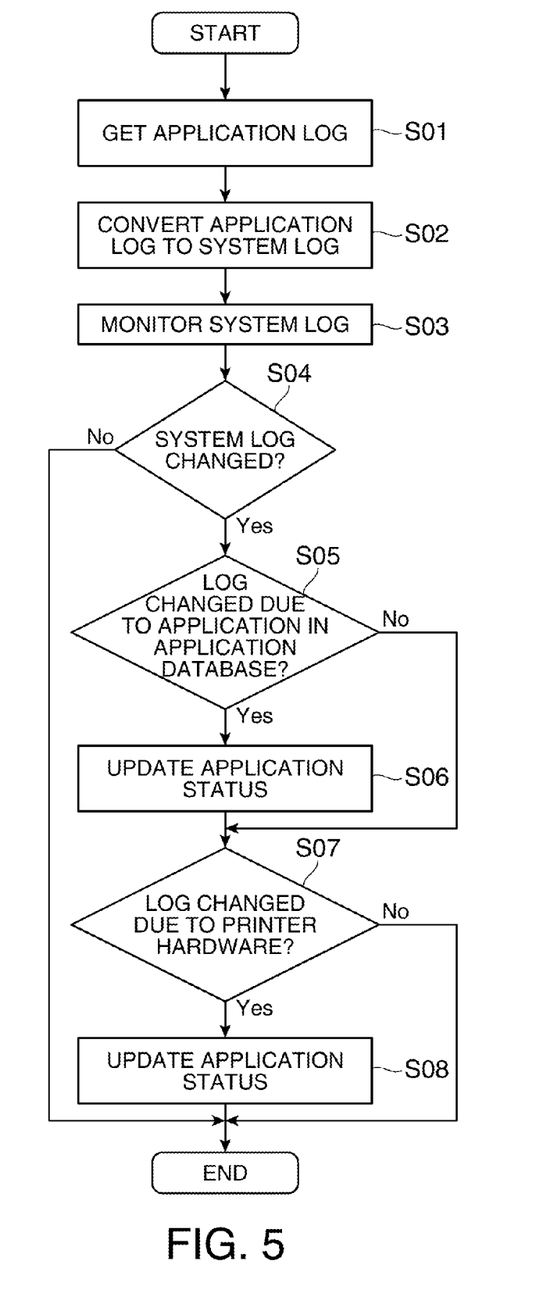
FIG. 5 is a flow chart showing the status update process of the printer of FIG. 1, in accordance with an embodiment.

The status update process of the printer 10 is described next with reference to the flow chart in FIG. 5.

When the printer 10 receives an application log from the application 21 through the log converter 23 (S01), it converts the application log to a system log (S02). The system log monitor 13 monitors the system log (system log for both hardware and applications 21) (S03), and determines if the system log changed (S04). If the system log did not change (S04 returns No), the status update process ends.

If the system log changed (S04 returns Yes), the status manager 15 determines if the change in the log relates to an application 21 in the application database 14 (S05). If the log changed related to an application 21 (S05 returns Yes), the status of that application 21 changed (S06). For example, if the previous status of application W was OK, and the status changed to ERROR, the status of application W is changed to ERROR in the log. If the log change does not relate to an application 21 in the application database 14 (S05 returns No), step S06 is skipped.

The status manager 15 then determines if the log change relates to printer 10 hardware (S07). If it relates to printer hardware (S07 returns Yes), the status of the related application 21 is updated (S08). For example, if the status of a particular hardware component was OK and changed to ERROR, the status of an application 21 that was OK is changed to ERROR. Conversely, if the hardware status was ERROR and changed to OK, the status of an application 21 that was changed to ERROR but the application 21 reports as OK is changed to OK.

If the log change does not relate to hardware (S07 returns No), step S08 is skipped.

A status sheet 31 reporting the status of applications 21 and hardware managed by the process described above is printed out by the printing unit 18 when triggered by the external command acquisition unit 17 receiving an appropriate external command. More specifically, whether a trigger was received by the external command acquisition unit 17 is determined, and when a trigger is received the printing unit 18 reads the status of applications 21 and hardware from the status storage unit 16, prints the status information on the print medium, and issues a status sheet 31.

As described above, a printer 10 according to this embodiment of the invention converts an application log to a system log, determines the application 21 status from the system log, and can therefore centrally manage the status of all applications 21 registered in the application database 14. There is therefore no need to write a status output function into every application 21, application development cost can therefore be reduced, and the cost of enabling status management can be reduced.

Furthermore, because a log converter 23 for converting application logs to a system log is embodied in each application platform 22, the logs for plural applications 21 can be converted to a single system log. The cost of status management can therefore be further reduced compared with when a log converter 23 is built into each application 21.

Furthermore, because the correlation between each application 21 and the application platform 22 is registered in the application database 14, the status manager 15 can accurately determine the application 21 to which the system log converted by the log converter 23 refers.

Furthermore, because the system log monitor 13 monitors the application 21 system log converted by the log converter 23 and the hardware system log in the printer 10, the status manager 15 can centrally manage both application 21 and hardware status information. As a result, because both application 21 and hardware status information can be output together, the user (service technician or other) can easily and quickly determine the status of the printer 10.

Furthermore, because the status manager 15 changes the application 21 status according to the hardware status, the application 21 status can be changed appropriately according to the hardware status, and output.

Printing the status sheet 31 is triggered in the foregoing embodiment by a service technician performing an operation for outputting a status sheet 31, but printing the status sheet 31 could also be triggered by a change in the system log (when there is a status change).

The status sheet 31 is issued for all applications 21 registered in the application database 14 in the embodiment described above, but the status sheet 31 could be printed for only those applications 21 for which the status is ERROR or only those applications 21 for which the status is OK, for example. The status sheet 31 could similarly be output only for hardware components for which the status is OK or is ERROR.

Yet further, while the status is reported for all applications 21 registered in the application database 14 in the embodiment described above, other configurations are also conceivable, such as reporting status information only for hardware where an ERROR occurred.

In the embodiment described above the status manager 15 manages application 21 status based on output from the system log monitor 13 and by referencing the application database 14. Alternatively, the system log monitor 13 could reference the application database 14, and determine if the system log output by the log converter 23 contains a log related to an application identifier registered in the application database 14. More specifically, the system log shown in FIG. 3 may be generated by the system log monitor 13. The system log monitor 13 could also evaluate if the application platforms 22 match (if the application platform 22 that supports the log converter 23 that converts the system log, and the application platform 22 corresponding to the application identifier contained in the system log, are the same).

Components of the printer 10 described above can also be embodied as a program. This program can also be provided stored on a recording medium (such as CD-ROM or flash memory). More specifically, a program that causes a computer to function as components of the printer 10, and a computer-readable recording medium recording this program, are also included in the scope of the accompanying claims.

The electronic device of the invention is described with reference to a printer 10 in the embodiment described above, but the invention can also be applied to electronic devices other than printers 10, including computing devices, display devices, and communication devices. More specifically, the invention can be applied to any device in which a plurality of applications can be installed.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A printing device in which a plurality of applications are installed, the printing device comprising:
a database that stores an application identifier for each of the applications;
one or more log conversion units that converts an application log to a system log, the system log including a plurality of records, at least one of the records corresponding to one of the applications and including the application identifier and status information for the corresponding application;
a status management unit that manages the plurality of applications by monitoring the system log for status changes and, when a status change related to an application identifier registered in the database, stores the status change in a status storage unit;
one or more application platforms, each of the applications being associated with one of the application platforms so that the application platform provides an execution environment for the application, wherein one of the one or more log conversion units is provided for each application platform;
the corresponding application platform is recorded for each application identifier in the database; and
the status management unit determines for at least one of the system log records if the application platform to which the log conversion unit that converted the system log record is installed, and the application platform corresponding to the application identifier contained in the database, are the same.

2. The printing device described in claim 1, wherein:
at least one of the system log records corresponds to a hardware portion of the electronic device and includes status information for the hardware portion; and
when a hardware status change to a new hardware status occurs in the system log related to a hardware portion of the printing device, the status management unit stores the new hardware status in the status storage unit.

3. The printing device described in claim 2, wherein:
the status management unit changes the application status in the status storage unit in response to changes in the hardware status.

4. The printing device described in claim 3, wherein:
when an error is contained in the hardware status, the status management unit changes the application status in the status storage unit to an error.

5. The printing device described in claim 1, further comprising:
a status output unit that outputs the status of all applications recorded in the database from the status storage unit.

6. A status management method for printing device in which a plurality of applications is installed, comprising the following acts executed by the electronic device:
- storing an application identifier for each application in a database;
- generating a system log from application logs for the applications, the system log including a plurality of records, at least one of the records corresponding to one of the applications and including the application identifier and status information for the corresponding application;
- monitoring the system log for status changes;
- when a status change to a new status occurs in the system log related to an application identifier registered in the database, storing the new status in a status storage unit
- wherein the printing device includes one or more application platforms, each of the applications being associated with one of the application platforms so that the application platform provides an execution environment for the application;
- wherein the system log is generated by the one or more application platforms;
- wherein the corresponding application platform is recorded for each application identifier in the database; and
- the status management step determines for at least one of the system log records if the application platform in which the conversion step that converts the system log record is executed, and the application platform corresponding to the application identifier contained in the database, are the same.

7. The status management method for the printing device described in claim 6, wherein:
- at least one of the system log records corresponds to a hardware portion of the electronic device and includes status information for the hardware portion, and the method further comprises storing a new hardware status in the status storage unit when a hardware status change to the new hardware status occurs in the system log related to a hardware portion of the printing device.

8. The status management method for the printing device described in claim 7, further comprising:
- changing the application status in the status storage unit in response to changes in the hardware status.

9. A computer-readable non-transitory storage medium storing a program that causes a computer to execute the acts of the electronic device status management method described in claim 6.

* * * * *